United States Patent

[11] 3,579,808

[72] Inventors Melvin A. Hagan
  Palos Verdes Peninsula;
  Roy I. Batista, Palos Verdes Estates, Calif.
[21] Appl. No. 809,039
[22] Filed Mar. 20, 1969
[45] Patented May 25, 1971
[73] Assignee TRW Inc.
  Redondo Beach, Calif.

[54] TANTALUM CLAD NIOBIUM
  1 Claim, No Drawings
[52] U.S. Cl. ....................................... 29/497.5,
  29/198, 29/504
[51] Int. Cl. ....................................... B23␣31/02
[50] Field of Search ........................... 29/198,
  497.5, 504, 487

[56] References Cited
  UNITED STATES PATENTS
  3,170,234 2/1965 Tarr ............................ 29/497.5

FOREIGN PATENTS
699,431 12/1964 Canada ....................... 29/497.5

OTHER REFERENCES

B. R. Garrett et al., "Broad Applications of Diffusion Bonding," NASA Contractor Report CR-409, pp. 19— 23, 62— 63, 109— 110, 138— 139.

Primary Examiner—John F. Campbell
Assistant Examiner—Ronald J. Shore
Attorneys—Daniel T. Anderson, Alan D. Akers and James V. Tura ABSTRACT: This invention relates to composite metal article and method for making the same wherein tantalum metal is applied to the surface of niobium metal and the two metals are diffusion bonded in a protective environment. The bonded metals may be cold worked to produce the final fabricated article.

TANTALUM CLAD NIOBIUM

As technology advances it becomes more inoperative to produce materials which can withstand higher temperatures. Many ceramics and cermets have been produced for a variety of applications in recent years to push the operating temperatures to ever higher levels. Aside from the major consideration of thermal stability of a material there also exists a problem of chemical stability in an oxidizing atmosphere. To be most useful a material must not melt or distort at higher operating temperatures, and in addition, the material must not decompose. Thus for example, many portions of aerospace vehicles, especially in their propulsion systems, temperatures well above the useful upper limit for common materials of construction may be encountered. The refractory metals, however, possess useable strength properties to about 3,000° F. and greater and have melting temperatures well above about 4,000° F. Unfortunately, the practical utilization of refractory alloys is hindered by their inherent propensity to react with oxidizing gases to form brittle compounds unless protected by coatings.

It has now been discovered that by coating tantalum onto niobium a higher temperature resistant coating which more fully utilizes their inherent mechanical properties may be obtained. By diffusion bonding a thin tantalum sheet onto a niobium plate and reducing the composite by cold rolling, a protective coating may be produced which prevents the oxidation and embrittlement of niobium while increasing their upper use temperature limits for structural applications. Cladding of niobium with tantalum in a fairly massive form, with subsequent reduction by cold rolling, is feasible because of closely similar thermal expansion properties, excellent ductility, and similar working properties or fabricability. Tantalum has a higher modulus of elasticity and a higher tensile strength, which partially offsets its weight disadvantage of being nearly twice as dense as niobium. Perhaps the most important factor is that conventional protective coatings permit higher use temperatures on tantalum than on niobium. Molten niobium oxide, which forms above about 2,700° F., exerts a strong fluxing action on protective coatings and can literally remove the coating as a droplet runs across the coated surface. This problem is considerably lessened with coated tantalum since tantalum oxide melts at a much higher temperature, approximately 3,400° F.

In the process according to this invention, tantalum sheet is hot rolled or hot pressed bonded to niobium plate in an inert atmosphere retort or furnace. The bonded parts are then given a diffusion heat treatment at about 2,400° F. in vacuum or inert atmosphere to develop a pore-free metallurgical bond. The plate thus formed can be cold rolled to obtain the desired sheet thickness. Parts formed from this sheet have the tantalum on the hot oxidizing atmosphere side, or if desired, both sides of the niobium can be clad with tantalum.

The present invention will be better understood by reference to the following illustrative examples.

EXAMPLE I

A 1½-inch square tab of niobium (0.0622 inch thick) and a 1½-inch square tab of tantalum (0.0105 inch thick) were bonded by heating for 2 hours at 1,000 p.s.i. pressure and 2,000° F. in an inert atmosphere. These tabs were then given a diffusion heat treatment in vacuum for 2 hours at 2,400° F. The tabs were cooled and then reduced by cold rolling from a thickness of about 0.072 inches to about 0.016 inches without difficulty.

EXAMPLE II

Six specimens were prepared using 1-foot square tantalum sheets (0.020 inch thick) and 1-foot square niobium plates (0.100 inches thick). The specimens were first cleaned and then placed in titanium retorts which were sealed by welding in a vacuum chamber. The retorts were heated to 2,200° F. and then rolled to approximately 50 percent reduction in thickness. After cooling and removal from the retorts, the hot roll bonded sheets were given a vacuum diffusion heat treatment at 2,600° F. for 2 hours. The sheets were then cold rolled whereby their thickness was reduced to as little as 0.010 inches without difficulty as indicated in the following table:

TABLE

| Specimen No.: | Average thickness |||
|---|---|---|---|
| | Sheet | Nb | Ta |
| 1 | .0718 | .0604 (84.0%) | .0114 (16.0%) |
| 2 | .0367 | .0289 (81.5%) | .0069 (18.5%) |
| 3 | .0335 | .0276 (82.5%) | .0059 (17.5%) |
| 4 | .0208 | .0170 (81.5%) | .0038 (18.5%) |
| 5 | .0196 | .0160 (81.5%) | .0036 (18.5%) |
| 6 | .0108 | .0089 (82.5%) | .0019 (17.5%) |

Metallographic examination of the cold rolled sheets showed uniform reduction in thickness of the niobium and tantalum.

Microhardness tests on samples showed that work hardening from cold rolling operations is easily eliminated by vacuum annealing, and the subsequent hardness values are again typical for annealed tantalum and niobium sheet. The interface diffusion zone showed microhardness values between those for tantalum sheet and niobium sheet.

The workability of the annealed tantalum-clad niobium sheet was demonstrated by deep drawing a 1 inch diameter, 2-inch long closed end cylinder from a 0.032-inch thick, 3-inch diameter sheet (0.005 inch Ta, 0.027 inch Nb). Measurements of a section of the drawn cylinder showed very little reduction in thickness of the tantalum and niobium during the drawing operation with essentially no change in the thickness ratio.

This invention teaches the concept of cladding tantalum on niobium in a fairly massive state with subsequent reduction to sheet by cold rolling. Since coated tantalum can be exposed to several hundred degrees higher temperatures than coated niobium in oxidizing environments without catastrophic failure caused by the fluxing action of the molten oxide, it is conceivable that the maximum useful temperature limit for some structures can thus be significantly increased without suffering the weight penalty involved in substituting tantalum for niobium.

We claim:
1. A method for cladding a niobium alloy comprising:
   a. pressing a tantalum sheet onto a niobium sheet,
   b. bonding said tantalum sheet to said niobium sheet by diffusion heat treatment at 2,400° F. to 2,600° F. in a nonoxidizing atmosphere, and
   c. rolling said bonded sheets to a predetermined thickness.